Figure 2:
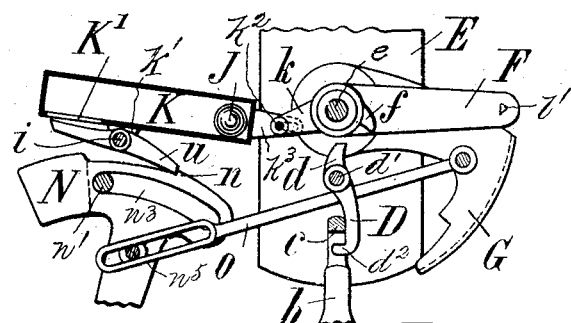

No. 637,897. Patented Nov. 28, 1899.
M. E. REISERT.
AUTOMATIC WEIGHING APPARATUS.
(Application filed Dec. 24, 1897.)

(No Model.) 2 Sheets—Sheet 1.

Witnesses
Inventor
Michael Eduard Reisert
by
Atty.

No. 687,897. Patented Nov. 28, 1899.
M. E. REISERT.
AUTOMATIC WEIGHING APPARATUS.
(Application filed Dec. 24, 1897.)

(No Model.) 2 Sheets—Sheet 2.

Witnesses:

Inventor
Michael Edward Reisert

UNITED STATES PATENT OFFICE.

MICHAEL EDUARD REISERT, OF HENNEF-ON-THE-SIEG, GERMANY.

AUTOMATIC WEIGHING APPARATUS.

SPECIFICATION forming part of Letters Patent No. 637,897, dated November 28, 1899.

Application filed December 24, 1897. Serial No. 663,379. (No model.)

*To all whom it may concern:*

Be it known that I, MICHAEL EDUARD REISERT, a subject of the Emperor of Germany, residing at Hennef-on-the-Sieg, in the Empire of Germany, have invented certain new and useful Improvements in Automatic Weighing Apparatus, (for which I have obtained a patent in Germany, No. 82,501, dated May 12, 1894, and in Great Britain, No. 19,887, dated October 18, 1894,) of which the following is a specification.

This invention has relation to weighing-machines for weighing more or less coarse granular materials the grains or lumps of which are of irregular size, in which machines the material is fed from a hopper to a self-tilting and self-righting receptacle hung from the scale-beam; and said invention has for its object certain improvements on machines of this class shown and described in my application for patent, Serial No. 663,378, filed December 24, 1898.

In the type of machine referred to the receptacle begins to descend the moment the load thereon is approximately equal to the weight on the weight-pan, at which time the feed-cut-off appliances are set in operation and gradually cut off the feed, this being completed about the time the scale-beam is in equipoise. In the weighing of finely-divided materials or granular materials the grains of which are small and of substantially uniform size the quantity of the material fed to the receptacle is gradually, yet somewhat rapidly, cut off to prevent overfeed, the live force of the material having but little influence on the receptacle. When handling coarse granular materials, especially such whose grains, or, more properly, lumps, are of irregular size and of considerable weight, the live force has a considerable influence on the receptacle and causes it to descend some appreciable time before the quantity of material actually necessary to balance the weight on the weight-pan has reached the receptacle, so that if the feed were cut off the moment the receptacle commenced to descend under its load and under the live force of the material the load would be of short weight. To avoid this, I provide means for momentarily arresting the downward movement of the receptacle until the scale-beam is substantially in equipoise, at which time the feed is completely cut off and the receptacle released, so that it may tilt to dump the load and then right itself and ascend under the weight on the weight-pan of the machine for the purpose of relieving the vessel from the influence of the live force of the material fed thereto, as fully described and illustrated in my application above referred to. I have found, however, that even this precaution does not always prevent short weight, and to avoid this I provide means for arresting the downward motion of the receptacle, not only before the scale-beam is in equipoise and before the feed is completely cut off, but also when said scale-beam is in equipoise, to indicate that the receptacle contains the proper quantity of material; but that my invention may be fully understood I will describe the same in detail, reference being had to the accompanying drawings, in which—

Figure 1:
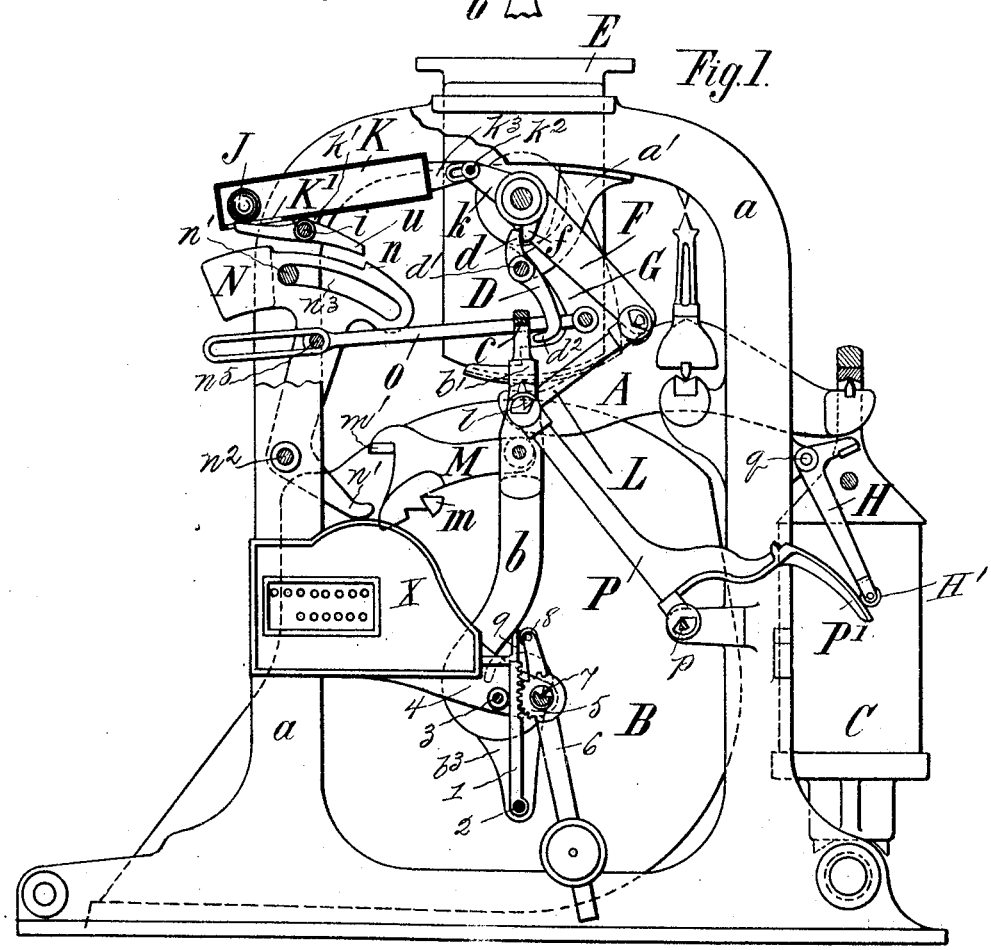
Figure 3:
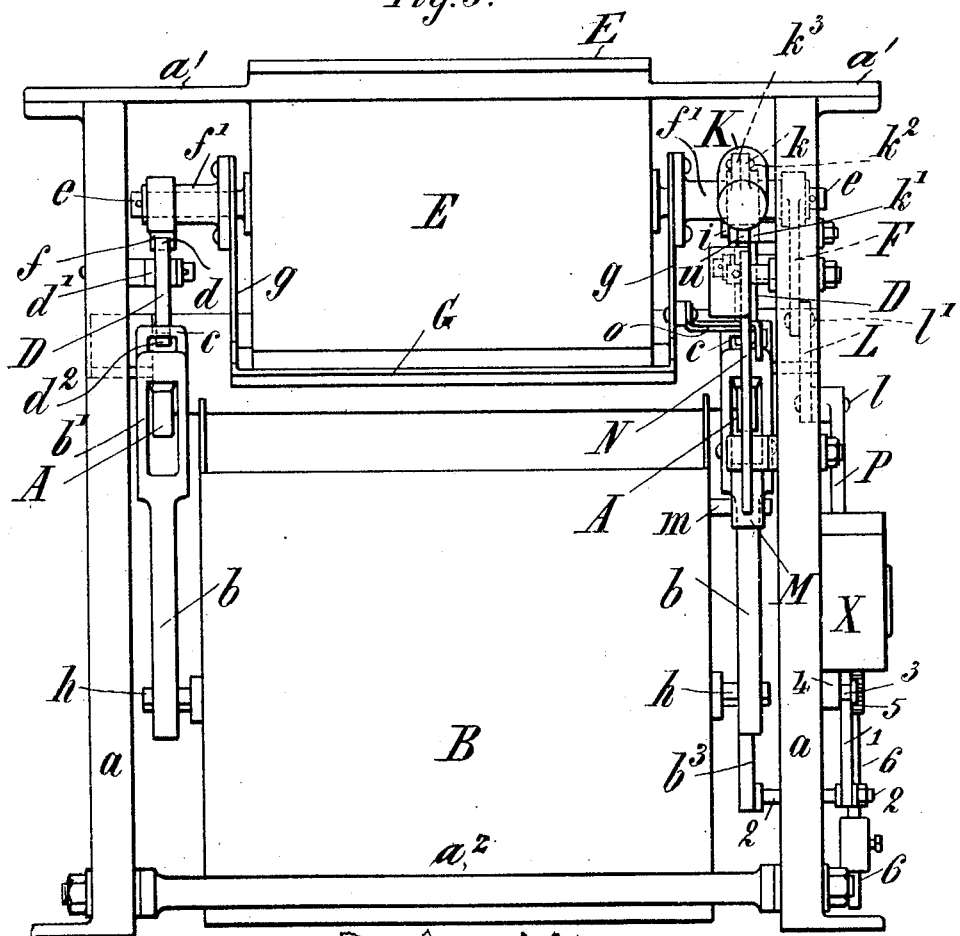

Figure 1 is a front view of a weighing-machine embodying my invention and illustrating the mechanisms in their relative positions when the scale-beam is in equipoise. Fig. 2 is a like fragmentary view illustrating certain elements of the mechanisms in their relative positions when the cut-off gate is open wide. Fig. 3 is a side elevation of the machine, and Fig. 4 a detail view.

The operative devices of the machine are supported from front and rear frames $a\ a$, connected by a top plate $a'$ and by tie-rods $a^2$, and in said top plate is hung the feed-hopper E, provided at opposite ends with stud-bearings $e$, on which are loosely mounted tubular journals $f'$, secured to the arms $g$ of the cut-off gate G, which in this manner can swing on said bearings. To each of the journals $f'$ is secured a sleeve or collar $f^2$, having a projection or cam $f$.

To stud $d'$ on the front and rear frames $a\ a$ are fulcrumed levers D D, and on the front gate-journal $f'$ is secured a radial arm F, to the free end of which is pivoted one end of a connecting-rod L, whose opposite end is pivotally connected to the free end of the longer arm P of a two-armed angular lever, whose short arm P' has a convex bearing-surface, upon which bears a roller H' on the long arm of a bell-crank lever H, fulcrumed at $q$ to a projection on the front frame $a$, and whose short arm lies in the path of the scale-beam A, Fig. 1.

With a view to reducing friction the connecting-rod L is pivoted to the arm P of lever P P' and to the radial arm F on knife-edges, as shown at $l$ and $l'$ in said Fig. 1.

The scale-beam A, as is common in this type of machines, is composed of two beams or levers, from the shorter arms of which the weight-pan is suspended on knife-edges, the beams themselves being fulcrumed on knife-edges having bearing on suitable blocks seated in brackets projecting from the front and rear frames $a$.

Figure 4:
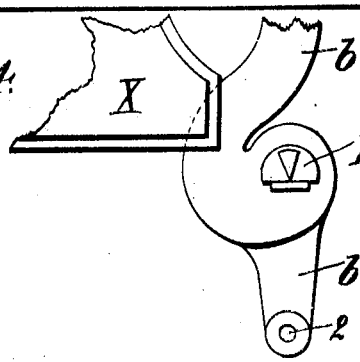

The receptacle B for the material to be weighed is suspended by knife-edges $h$, Fig. 4, from the lower end of hangers $b$, themselves suspended from knife-edges from the scale-beam A, said hangers having vertically-slotted extension $c$ at their upper end and adapted to be engaged by the hook end $d^2$ of levers D. To the front hanger $b$ is pivoted a latch M, provided with a tooth adapted to engage a prism-shaped lug $m$, projecting from the front wall of the receptacle B, and said latch has a shoulder $m'$, adapted to be engaged by the short arm $n'$ of a weighted tripping-lever N, fulcrumed at $n^2$ to a stud on the front frame $a$. The longer arm of the lever N has a segmental head concentric with its axis of rotation, on the upper face of which is formed a stop-shoulder $n$, and in said head is formed a segmental slot $n^3$, into which projects a pin or stud $n^4$ on the front frame $a$.

The tripping-lever N has a stud or pin $n^5$, which projects into the longitudinal slot in a connecting-rod O, pivoted to the cut-off gate G, and upon a stud $i$, projecting from the front face $a$, is fulcrumed a tubular lever K, pivoted to a radial arm $k$ on the gate-journal $f'$, said lever having perforated fulcrum-lugs $k'$ straddling a lever $u$, also fulcrumed on stud $i$, and whose outer arm is adapted to project into the tubular lever K through a longitudinal slot K' in its outer arm, the said lever K containing a rolling body, as a sphere J, of metal, for the purpose of tilting the same when properly positioned.

The operation of the weighing-machine is substantially such as described in my application above referred to, except as to the means whereby the receptacle is released, so that it may tilt under a load and dump the latter.

In Fig. 2 the cut-off gate is open to the fullest extent. The hook ends $d^2$ of levers D lie in the slot of the hanger extensions $c$, said gate being held in that position by the scale-beam A bearing an the short arm of bell-crank lever H. When the receptacle B commences to descend under its load, the bell-crank lever H is gradually released, the cut-off gate G swinging on its bearings $e$ to gradually close the hopper-outlet. When the scale-beam is about in equipoise, the cam on cam-sleeve $f$ acts upon the short arm of lever D, thereby moving its longer arm out of slot in hanger extension $c$, at which moment the cut-off gate is about to completely cut off the feed, Fig. 2, a further slight downward movement of the receptacle B causing said gate to completely cut off the feed and at the same time causing the weighted lever N to be thrown over its dead-center, thereby releasing latch M from stud $m$ and allowing the receptacle B to tilt over and dump its load. In this operation it is not always certain that the receptacle B carries a quantity of material the weight of which is exactly equal to the weight on the weight-pan, and to insure this I provide means for momentarily arresting the downward movement of the scale-beam as soon as it is in equipoise, and when released by the levers D, after which the radial arm $k$ on the journal $f'$ of gate G lifts the inner end of the tubular lever K sufficiently to cause the ball J to roll from the inner to the outer end of said lever, thereby tilting the latter and bringing the outer arm of lever $u$ into the path of said ball, which trips said lever $u$, thereby releasing the weighted lever N, which is then thrown over to release the receptacle B, as above stated.

It will be observed that the feed is gradually cut off as the receptacle B descends, and before the feed is completely cut off but little material is fed to the receptacle, the operation being somewhat like that effected by an operator throwing material into the receptacle in small quantities at a time to balance the weight on the weight-pan, the downward movement of said receptacle being arrested by the levers D until the scale-beam is about in equipoise; but it is obvious that even under a reduced feed the live force of the material still exerts some influence on the receptacle, and in order to obtain an exact weight I provide the additional locking-lever K, which holds the scale-beam in equipoise for a moment before the gate G completely cuts off the feed, and whereby a sufficient quantity of material is fed to the receptacle B to compensate the live force.

In Figs. 1 and 2 I have shown means similar to those shown and described in my application above referred to for automatically registering the loads weighed, the registering mechanism, of any well-known description, being contained in a casing X, its prime mover being actuated in a well-known manner by a rod 9, the upturned end or shoe of which has bearing on a roller 8 at the end of the short-arm of a weighted lever 6, pivoted on knife-edge 7 on a suitable bearing secured to a bracket or projection 4 on said casing X, said lever having a segment-gear 5 rigidly secured thereto or formed integral therewith and gearing in a rack-bar 1, pivoted to a downwardly-projecting arm $b^3$ on the front hanger $b$, said rack-bar being guided by a roller mounted on a pin 3, secured to the aforesaid projection 4 of the casing X.

It is obvious that as the receptacle B descends under a load the rack-bar 1 will turn the lever 6 so that its short arm will swing toward the left, thereby moving the actuating-rod 9 in a like direction to impart a partial rotation to the prime mover of the registering mechanism. When, on the contrary, the empty receptacle ascends, the short arm of lever 6 will swing toward the right, thus permitting the actuating-rod 9 to be moved back into a normal position, as by the action of a spring, a means commonly employed.

Having thus described my invention, what I claim as new therein, and desire to secure by Letters Patent, is—

1. In a weighing-machine such as described, the combination with the receptacle for the material to be weighed, the scale-beam from which said receptacle is hung, a locking-latch for locking said receptacle against tilting after dropping to a predetermined extent, and a locking-lever arresting the downward movement of said receptacle as the scale-beam is about to reach a position of equipose; of a feed-hopper, a cut-off gate, means for automatically actuating the same to gradually cut off the feed, means operated by said gate during its cut-off movement to first release the locking-lever and then the locking-latch, and means for momentarily arresting the operation of the latch-releasing mechanism when the scale-beam is in equipose and before the cut-off gate completely cuts off the feed, for the purpose set forth.

2. The combination with the tripping-lever N, having stop-shoulder $n$, the two-armed lever $u$ whose inner arm is adapted to engage said shoulder, and the cut-off gate one of the tubular journals of which carries a radial arm $k$; of the tubular lever K pivoted to said radial arm $k$ and fulcrumed to the fulcrum-stud of lever $u$, said lever K having perforated lugs straddling said lever $u$, a shiftable body, as a ball, contained in lever K, which latter is provided with a longitudinal slot in register with the outer arm of lever $u$, substantially as and for the purpose set forth.

MICHAEL EDUARD REISERT.

Witnesses:
  WILLIAM H. MADDEN,
  KÄTCHEN STENZ.